Patented June 28, 1927.

1,633,927

UNITED STATES PATENT OFFICE.

JOSEPH G. DAVIDSON, OF YONKERS, NEW YORK, ASSIGNOR TO CARBIDE & CARBON CHEMICALS CORPORATION, A CORPORATION OF NEW YORK.

ETHER OF POLYOLEFIN GLYCOL AND PROCESS FOR MAKING THE SAME.

No Drawing.   Application filed July 20, 1925.   Serial No. 44,830.

The simple glycols have the typical formula

R being an alkylene group. There are also more complex glycols, such as would be formed if two or more molecules of a simple glycol should condense, i. e. combine with the elimination of water. These are known as polyolefin glycols. Thus diethylene glycol, $CH_2OHCH_2OCH_2CH_2OH$, may be postulated as the product of the condensation of two molecules of ethylene glycol; triethylene glycol, $CH_2OHCH_2OCH_2CH_2OCH_2CH_2OH$, as the result of the condensation of three molecules of ethylene glycol (or one molecule of ethylene glycol with one of diethylene glycol), and so with the tetra, penta, and higher polyethylene glycols. The other glycols, such as the propylene compound, form similar series.

The present invention comprises products such as would be obtained by converting one or more of the hydroxyl groups of a polyolefin glycol into ether linkages, and attaching a corresponding number of alkyl or aryl groups thereto; and it also comprises processes of making such compounds.

I have found that the mono-ethers of the polyolefin glycols can be prepared by the reaction of the olefin oxids with either alcohols or the ethers of simpler glycols. The following equations will illustrate the reactions:

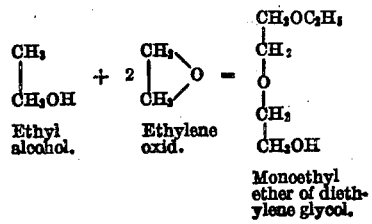
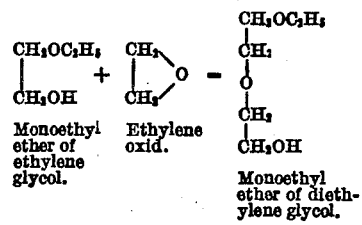

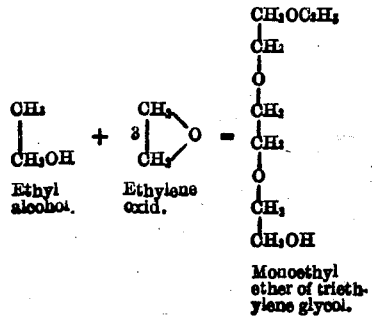

The mono-ethers of the polyolefin glycols corresponding to the higher olefins can be prepared by using the higher olefin oxids, e. g. propylene oxid,

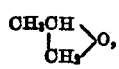

instead of ethylene oxid. If aryl ethers are to be prepared, the material brought into reaction with the olefin oxid in the manner described above may be an aryl alcohol, such as phenol or benzyl alcohol, or it may be an aryl ether of a glycol in a lower stage of condensation, e. g.,

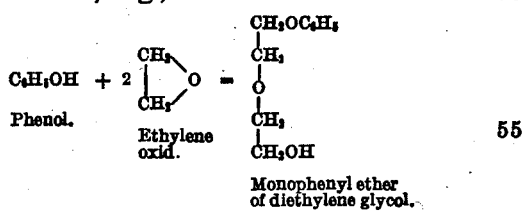

Methods for producing the ethers of monoolefin glycols, particularly propylene glycol, are described in my application Serial No. 44,929 filed simultaneously herewith.

The reaction of the olefin oxid with either an alcohol or a glycol ether is best brought about under elevated temperatures and pressures. The reacting materials are mixed together at a temperature below the boiling point of the mixture, sealed in an autoclave and heated until the reaction ceases. Pressure will of course be developed on heating, this pressure being highest at first and then subsiding as the reacting materials are converted into the less volatile final product. The reaction is accelerated at higher temperatures, the pressure developed being correspondingly increased and the time of reaction shortened. Temperatures of 70° C. to 250° C. are generally suitable. The pressure developed may rise to 300 pounds per square inch or higher.

The di-ethers of the polyolefin glycols can be prepared by methods which are illustrated by the following equations:

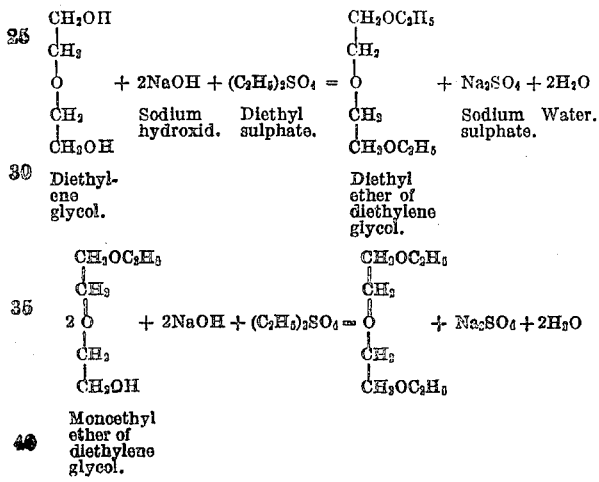

In the first of the above reactions a portion of the glycol is converted to the monoether. The yield of di-ether is raised by increasing the quantity of diethyl sulphate used beyond that required by the equation. The alkali should be present in quantity at least sufficient to decompose completely the diethyl sulphate. The reacting materials are preferably anhydrous, or nearly so, though the presence of water appears to have no detrimental effect other than to decrease the yield.

The ethers of the polyolefin glycols are in general good solvents and plasticizers for cellulose esters, the mono-ethers being superior to the di-ethers. Their boiling points range upward from about 190° C. for the monoethyl ether of diethylene glycol. They may be used for this purpose in conjunction with a wide variety of other solvents and diluents, as is usually the case in the cellulose ester art. Valuable mixtures are produced when one or more of the reacting materials is derived from a mixture of olefins and is hence itself a mixture. Thus, instead of using a single olefin oxid, a mixture of olefin oxids may be employed. A mixture of ethers of polyolefin glycols, usually containing other substances, is thus produced. A partial separation of this mixture may be effected or the mixture may be used without separation, according to the purpose for which the product is intended.

I claim:
1. A polyolefin glycol ether.
2. A polyolefin glycol monoethyl ether.
3. A polyethylene glycol monoalkyl ether.
4. A diethylene glycol monoalkyl ether.
5. Diethylene glycol monoethyl ether.

In testimony whereof, I affix my signature.

JOSEPH G. DAVIDSON.